(12) United States Patent
Nakai

(10) Patent No.: US 6,873,463 B2
(45) Date of Patent: Mar. 29, 2005

(54) DIFFRACTIVE OPTICAL ELEMENT AND OPTICAL SYSTEM HAVING THE SAME

(75) Inventor: Takehiko Nakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 213 days.

(21) Appl. No.: 09/960,283

(22) Filed: Sep. 24, 2001

(65) Prior Publication Data

US 2002/0036827 A1 Mar. 28, 2002

(30) Foreign Application Priority Data

Sep. 27, 2000 (JP) .................................. 2000-294286

(51) Int. Cl.[7] ................................................ G02B 5/18
(52) U.S. Cl. .................... 359/574; 359/565; 359/569; 359/570; 359/571; 359/575; 359/576
(58) Field of Search ........................... 359/565, 566, 359/569, 571, 573–575, 570; 369/112.03–112.09

(56) References Cited

U.S. PATENT DOCUMENTS

| | | | | |
|---|---|---|---|---|
| 5,044,706 A | | 9/1991 | Chen | 359/357 |
| 5,117,306 A | * | 5/1992 | Cohen | 359/565 |
| 5,120,120 A | * | 6/1992 | Cohen | 351/161 |
| 5,260,828 A | * | 11/1993 | Loudono et al. | 359/565 |
| 5,299,062 A | | 3/1994 | Ogata | 359/571 |
| 5,790,321 A | | 8/1998 | Goto | 359/742 |
| 6,157,488 A | | 12/2000 | Ishii | 359/569 |
| 6,473,232 B2 | * | 10/2002 | Ogawa | 359/565 |

FOREIGN PATENT DOCUMENTS

| | | |
|---|---|---|
| EP | 1072906 A2 * | 1/2001 |
| JP | 4-213421 | 8/1992 |
| JP | 6-324262 | 11/1994 |
| JP | 9-127322 | 5/1997 |
| WO | WO 97/10527 | 3/1997 |

OTHER PUBLICATIONS

European Search Report in Application No. 01308170.8–1234– (Oct. 20, 2003).

* cited by examiner

*Primary Examiner*—Leo Boutsikaris
(74) *Attorney, Agent, or Firm*—Fitzpatrick, Cella, Harper & Scinto (57) ABSTRACT

Disclosed is a diffractive optical element which is made of at least two materials of different dispersions and which includes at least two diffraction gratings being accumulated one upon another, wherein each diffraction grating is formed on a curved surface of a substrate, and wherein a diffraction grating, of the at least two diffraction gratings, in which a curvature radius of the curved surface and a curvature radius of a grating surface in a portion where a grating pitch is largest, have different signs, is one of the at least two diffraction gratings which has a smallest grating thickness.

25 Claims, 10 Drawing Sheets

DIFFRACTIVE OPTICAL ELEMENT AND OPTICAL SYSTEM HAVING THE SAME

FIELD OF THE INVENTION AND RELATED ART

This invention relates to a diffractive optical element and an optical system having such diffractive optical element. More particularly, the invention concerns a diffractive optical element and an optical system having the same, to be used with light having plural wavelengths or bandwidths.

As an alternative to reducing chromatic aberration by combining lenses of different glass materials, use of a diffractive optical element having a light diffracting function in a portion of an optical system such as a lens surface thereby to reduce chromatic aberration has been proposed, in "SPIE", Vol. 1354, International Lens Design Conference, 1990, or disclosed in Japanese Laid-Open Patent Application, Laid-Open No. 213421/1992, Japanese Laid-Open Patent Application, Laid-Open No. 324262/1994, or U.S. Pat. No. 5,044,706, for example.

This is based on a physical phenomenon that, between a refractive surface and a diffractive surface in an optical system, chromatic aberrations with respect to light rays of a certain reference wavelength are produced in opposite directions. Further, such diffractive optical element can provide an effect like an aspherical surface lens, by changing the period of the periodic structure thereof. Thus, it is very effective to reduce the aberration.

In the refraction, a single light ray is still a single light ray even after it is refracted. In the diffraction, as compared therewith, usually a single light ray is divided into light rays of different diffraction orders. In consideration of this, where a diffractive optical element is to be used in a lens system, it is necessary to determine the grating structure so that a light flux of a used wavelength region is concentrated to a single predetermined order (hereinafter, this will be referred to also as "design order"). If light is concentrated to a predetermined order, the intensity of light rays of any other diffraction orders becomes small. If the intensity is zero, it means that such diffraction light does not exist.

In order to accomplish the features described above, the diffraction efficiency of light rays at the design order must be sufficiently high throughout the whole used wavelength region. If there are light rays of diffraction orders different from the design order, such light rays are imaged at a location different from the light of the design order. Therefore, it results in unwanted light such as flare. Therefore, in an optical system having a diffractive optical element, it is very important to pay much attention to the spectral distribution of diffraction efficiency at the design order as well as the action of light rays of orders different from the design order.

Figure 13:
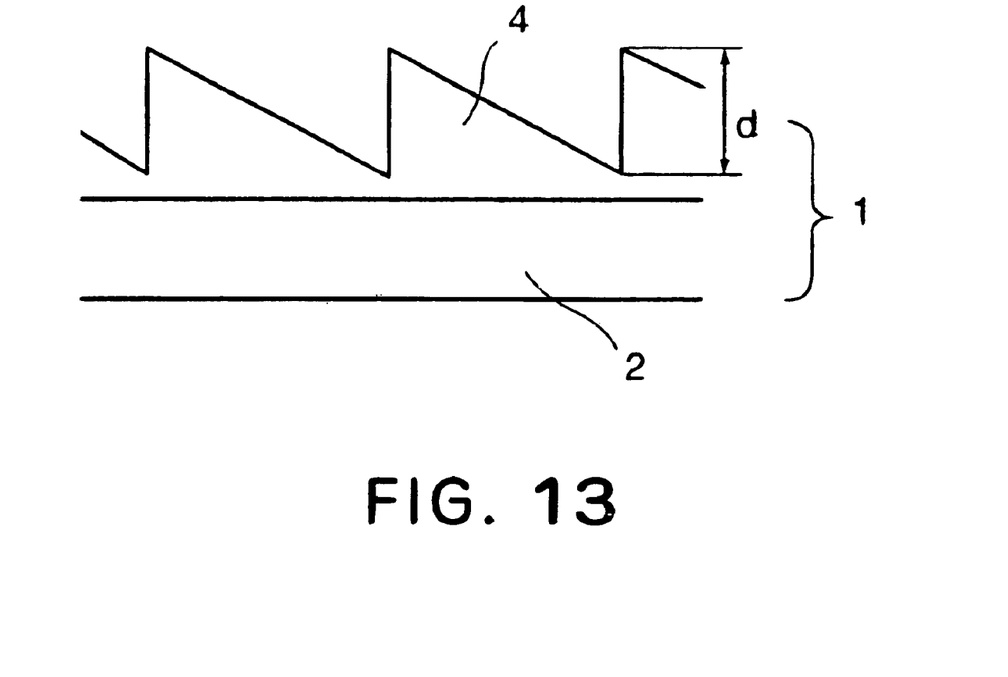
FIG. 13 is a schematic view showing a conventional example of grating shape (triangular wave shape).
Figure 14:
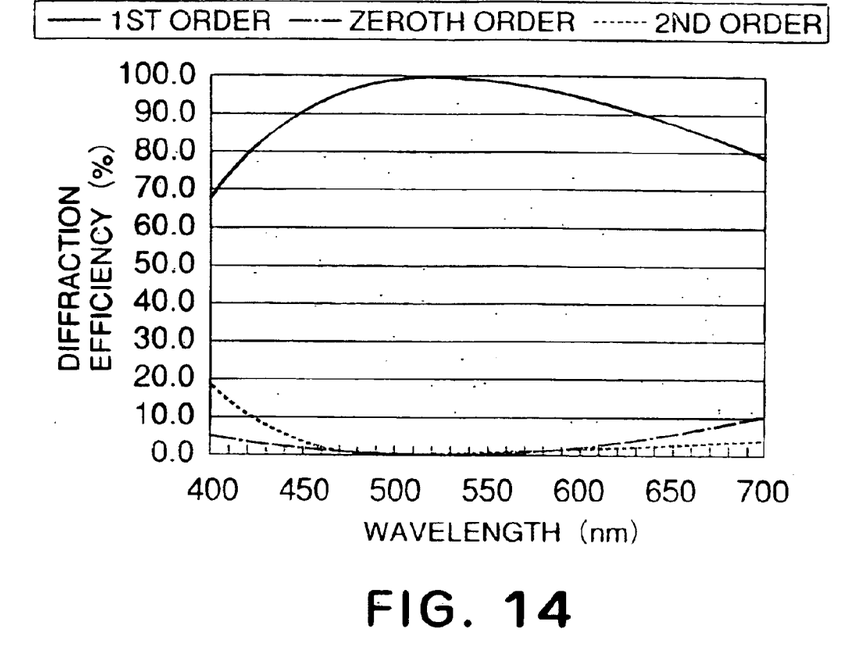
FIG. 14 is a graph for explaining diffraction efficiencies in a conventional example.

FIG. 13 shows a diffractive optical element formed on a certain surface. FIG. 14 shows diffraction efficiency curves of this diffractive optical element, with respect to particular diffraction orders. In the following, each value of diffraction efficiencies corresponds to the proportion of the light quantity of individual diffraction light to the overall transmitted light, and it excludes reflection light at a grating interface, for example, to avoid complexity.

In FIG. 14, the axis of abscissa shows the wavelength, and the axis of ordinate denotes the diffraction efficiency. The diffractive optical element shown in FIG. 13 is designed so that it shows highest diffraction efficiency with respect to a used wavelength region, at the first diffraction order (solid curve in FIG. 14). Namely, the design order is first order. In FIG. 14, diffraction efficiencies at diffraction orders adjacent the design order (i.e. zeroth and second order lights around the first order) are also shown. It is seen from the drawing that, for the design order, the diffraction efficiency becomes highest at a certain wavelength (hereinafter, "design wavelength"). At wavelengths other than this, the efficiency decreases gradually. Any decrease in the diffraction efficiency at this design order leads to diffraction light of other orders and, thus, to flare. Particularly, where plural diffraction gratings are used, a decrease in the diffraction efficiency at a wavelength other than the design wavelength causes a decrease of transmission factor.

Figure 15:
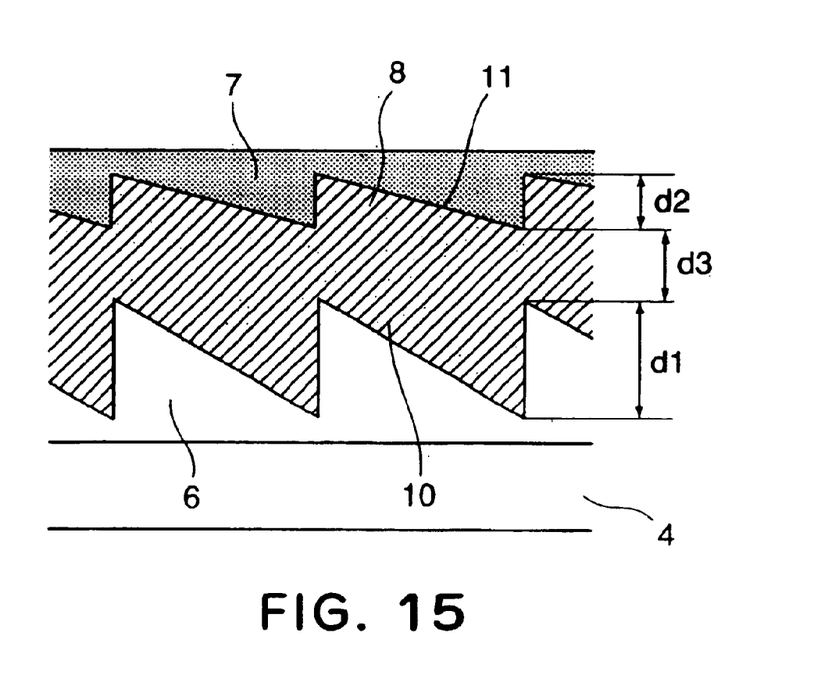
FIG. 15 is a sectional view showing the sectional shape of a conventional example of an accumulative diffractive optical element.

Japanese Laid-Open Patent Application, Laid-Open No. 127322/1997 shows a diffractive optical element which is arranged to reduce the decrease of diffraction efficiency. FIG. 15 shows this structure in which three different materials and two different grating thicknesses are used with optimization. The elements are disposed in proximity at an even pitch distribution, by which a high diffraction efficiency is accomplished throughout the whole visible wavelength region.

The diffractive optical element shown in FIG. 15 has a layered sectional shape comprising an accumulation of three layers. By optimizing refractive indices and dispersion characteristics of the materials constituting these three layers and by optimizing the grating thickness of each element, high diffraction efficiency is provided.

Figure 16:
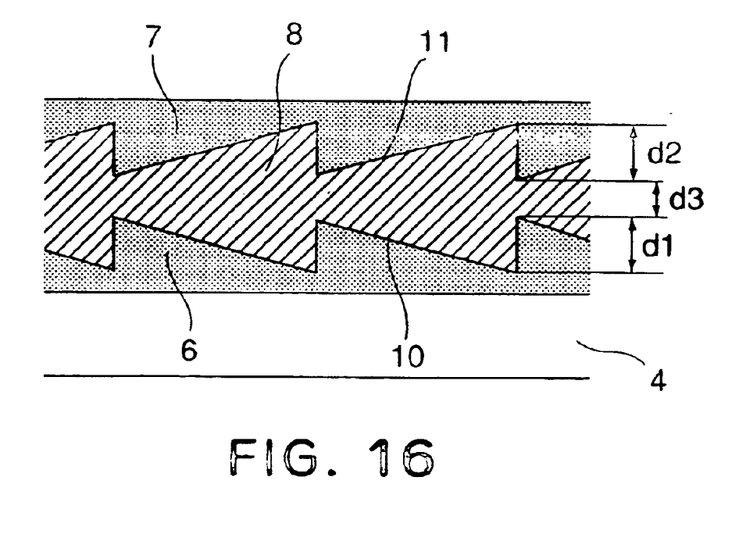
FIG. 16 is a sectional view showing the sectional shape of another conventional example of an accumulative diffractive optical element.

Another example is shown in FIG. 16 in which plural diffractive optical elements are combined. A better incidence angle characteristic is obtainable if the grating surfaces of the diffraction gratings face different directions.

In the diffractive optical element disclosed in Japanese Laid-Open Patent Application, Laid-Open No. 127322/1997 or in the diffractive optical element shown in FIG. 16 having grating surfaces facing in different directions, the plane connecting the tips or free ends of the grating is planar.

Figure 17:
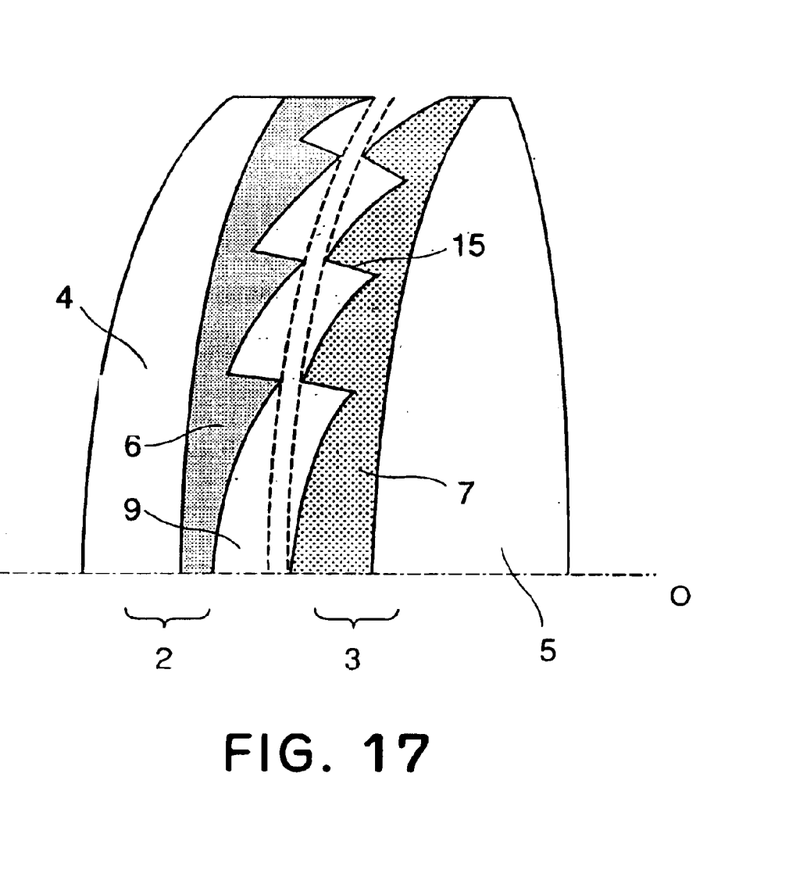
FIG. 17 is a sectional view showing the sectional shape of a conventional example of a diffractive optical element formed on a curved surface.

FIG. 17 shows another example in which the grating shape of a diffractive optical element is formed upon a curved surface. While the grating pitch or grating thickness of the structure is suggested, no specific discussion has been made with regard to combination of plural gratings. Where a diffractive optical element having a layered structure comprising plural diffraction gratings is formed on a curved surface, in accordance with conventional grating combination method, actually, the diffractive optical element on the curved surface can not be produced with a good precision on the basis of molding, for example. It is very difficult to assure the same performance as of a diffractive optical element of the same layered structure, being formed on a flat surface.

SUMMARY OF THE INVENTION

It is accordingly an object of the present invention to provide a diffractive optical element by which at least one of the inconveniences described above can be avoided.

It is another object of the present invention to provide an optical system having such diffractive optical element incorporated thereinto, by which flare or the like can be suppressed effectively.

In accordance with an aspect of the present invention, there is provided a diffractive optical element made of at least two materials of different dispersions, and including at least two diffraction gratings being accumulated one upon another, wherein each diffraction grating is formed on a curved surface of a substrate, and wherein a diffraction grating, of said at least two diffraction gratings, in which a curvature radius of the curved surface and a curvature radius of a grating surface in a portion where a grating pitch is largest, have different signs, is one of said at least two diffraction gratings which has a smallest grating thickness.

In one preferred form of this aspect of the present invention, said diffraction grating having a smallest grating thickness is structured so that an angle which is defined between the grating surface and a grating edge of that diffraction grating is obtuse more than an angle which is defined between the grating surface and a normal to the surface at a position where a plane connecting grating free ends of the smallest-thickness diffraction grating and the grating surface intersect with each other.

The grating edge of the diffraction grating may be made in parallel to an optical axis.

The curvature of the plane connecting the grating free ends may be approximately even, in each diffraction grating of said at least two accumulated diffraction gratings.

At least one of said at least two diffraction gratings may be formed at an interface of two different materials having different dispersions.

Said at least two accumulated diffraction gratings may be bonded with each other in a non-grating region.

Said at least two diffraction gratings may include at least one grating of a shape in which a direction of the grating thickness is different.

Said diffractive optical element may be effective to improve a diffraction efficiency of a predetermined order, over a whole visible light region of a used wavelength.

There may be a wavelength included in the used wavelength range which wavelength satisfies the following relation:

$$\pm(n01-1)d1\pm(n03-1)d2+(n02-1)d2=m\lambda 0$$

where n01 is a refractive index of the material of a first diffraction grating with respect to a wavelength $\lambda 0$, n02 is a refractive index of the material of a second diffraction grating with respect to the wavelength $\lambda 0$, n03 is a refractive index of the material of a third diffraction grating with respect to the wavelength $\lambda 0$, d1 and d2 are thicknesses of the first and second diffraction gratings, and m is a diffraction order.

The substrate may have a lens function.

In accordance with another aspect of the present invention, there is provided a diffraction optical system including a diffractive optical element as recited above.

In one preferred form of this aspect of the present invention, said optical system is an imaging optical system.

Said diffractive optical element may be provided at one of a lens cemented surface and a lens surface, or inside a lens.

Said optical system may be an observation optical system.

Said diffractive optical element may be provided at a side of a lens, constituting the observation optical system, which faces an objective lens side thereof.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will be described with reference to the attached drawings.

[Embodiment 1]

Figure 1:
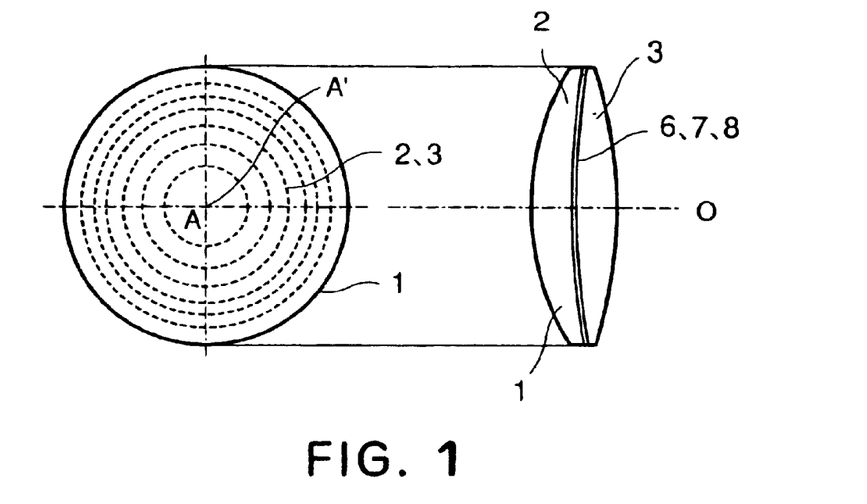
FIG. 1 is a schematic view of a diffraction lens according to a first embodiment of the present invention.

FIG. 1 is a schematic view (including a front view and a side views) of a diffractive optical element according to a first embodiment of the present invention. The diffractive optical element 1 has a structure in which a first diffractive optical element 2 and a second diffractive optical element 3 are closely juxtaposed with each other. In FIG. 1, as viewed in the direction of an optical axis, the diffraction gratings have a concentric grating shape such that it provides a lens function. Also, grating elements (diffraction gratings) 6, 7 and 8 are formed on a curved surface.

Figure 2:
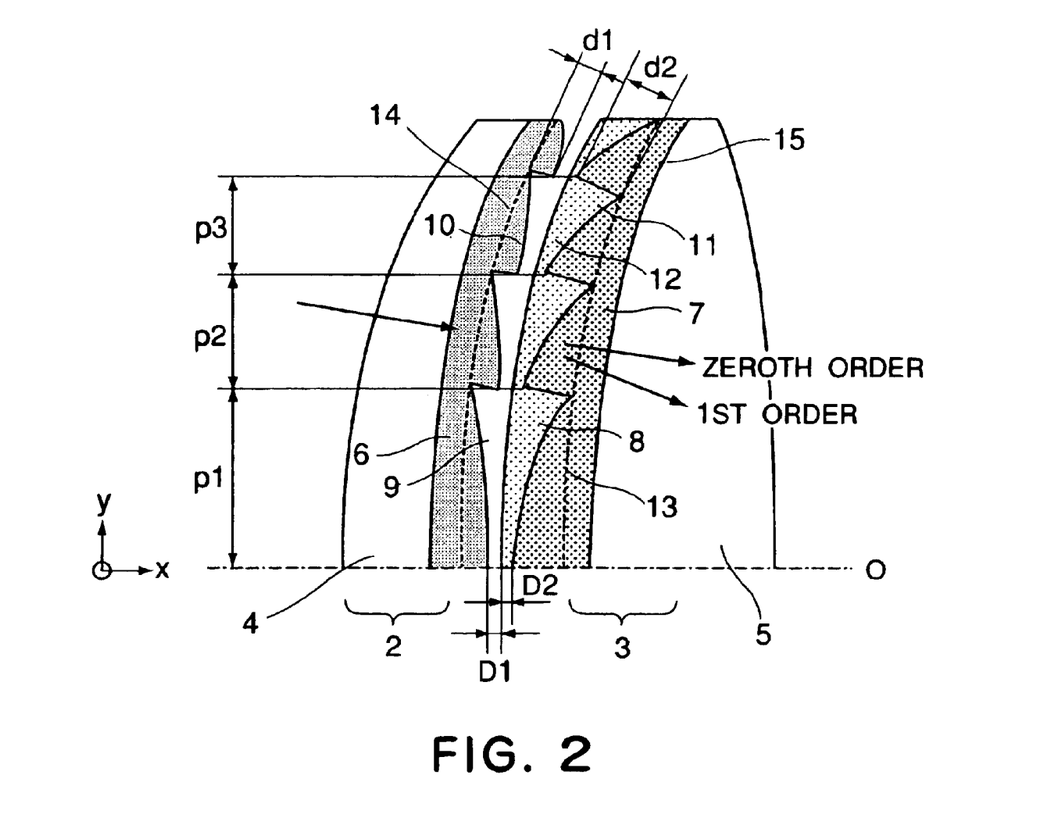
FIG. 2 is a schematic view showing the sectional shape of diffraction gratings in the first embodiment of the present invention.

FIG. 2 is a schematic view showing the sectional shape of a portion of the diffractive optical element of FIG. 1, being cut along a line A-A' in FIG. 1. In FIG. 2, diffraction gratings are illustrated while being much deformed in the grating depth direction. Also, for better understanding, the grating pitch is reduced in the illustration. The diffractive optical element of this embodiment has such structure that it comprises a first diffractive optical element 2 having a diffraction grating 6 formed on the surface of a substrate 4 and a second diffractive optical element 3 having second and third diffraction gratings 7 and 8 formed on the surface of another substrate 5, wherein the first and second diffractive optical elements 2 and 3 are closely juxtaposed with each other with an air layer 9 being interposed therebetween. These layers function in combination, as a single diffractive optical element.

The surface 12 of the diffraction grating 8 which is on the opposite side of the grating surface 11 of the diffraction grating 8 is a curved surface where no grating is formed. It has a curvature radius effectually the same as that of a curved surface 15 of the substrate 5 where a diffraction grating is formed. Further, in both of the substrates 4 and 5, the surface having a grating formed thereon and the other surface on the opposite side are curves surfaces. Thus, the substrate itself provides a dioptric lens function.

First, the diffraction efficiency of a diffractive optical element will be described.

FIG. 13 shows an ordinary single-layer transmission type diffraction grating. In such diffraction grating, the condition for a largest diffraction efficiency with a design wavelength $\lambda 0$ is that: If the light flux is perpendicularly incident on the grating, the optical path difference between the peak and the trough of the diffraction grating should be equal to a product of the wavelength by an integer. Thus, it follows that:

$$(n01-1)d = m\lambda 0 \quad (1)$$

where n01 is the refractive index of the material of the diffraction grating with respect to the wavelength $\lambda 0$, d is the grating thickness, and m is the diffraction order.

In the case of an accumulative diffractive optical element having two layers or more of diffraction gratings, basically what described above applies to it. In order that all the layers function in combination as a single diffraction grating, in relation to each layer, the optical path difference between the peak and the trough of the diffraction grating defined at the interface of the adjacent materials is detected, and the structure is determined so that the combined optical path differences of all the layers become equal to the product of the wavelength by an integer. Therefore, in the case of the accumulative diffractive optical element shown in FIG. 2, the condition for a largest diffraction efficiency when the light is perpendicularly incident on the diffractive optical element, is as follows:

$$\pm(n01-1)d1 \pm (n03-1)d2 \pm (n02-1)d2 = m\lambda 0 \quad (2)$$

where n01 is the refractive index of the material of the first diffraction grating with respect to the wavelength $\lambda 0$, n02 is the refractive index of the material of the second diffraction grating with respect to the wavelength $\lambda 0$, n03 is the refractive index of the material of the third diffraction grating with respect to the wavelength $\lambda 0$, and d1 and d2 are grating thicknesses of the first and second diffraction gratings, respectively. The diffraction gratings 7 and 8 have the same grating thickness d2. Here, as regards the diffraction direction, if diffraction in a direction below the zeroth order diffraction light (FIG. 2) is taken as positive (positive diffraction order), the sign of increase/decrease of each layer in equation (2) is such that: the grating shape (diffraction gratings 6 and 7) in which the grating thickness increases from the above toward the below as illustrated is positive, while the grating shape (diffraction grating 8) in which the grating thickness increases from the below to the above is negative. Thus, the structure of FIG. 2 can be expressed in terms of equation (2) as follows:

$$(n01-1)d1 + (n02-1)d2 - (n03-1)d2 = m\lambda 0 \quad (3)$$

Referring to specific examples, details will be described below.

First of all, the first diffractive optical element 2 has the following structure. As regards the material constituting the grating elements, the first diffractive optical element 2 uses an ultraviolet-ray setting resin (nd=1.635 and vd=23.0), and the grating thickness is 3.54 microns.

Similarly, the second diffractive optical element 3 has the following structure. The second diffractive optical element 3 comprises second and third diffraction gratings 7 and 8. As regards the material constituting the grating elements, the second diffraction grating 7 is made of an ultraviolet-ray setting resin RC8922 (trade name) (nd=1.5129, vd=50.8) available from Dainippon Ink Chemical Industry, Japan, and the third diffraction grating is made of an ultraviolet-ray setting resin HV1 (trade name) (nd=1.598, vd=28.0) available from ADELL Co., Japan. The grating thickness is 19.5 microns.

Figure 3A:
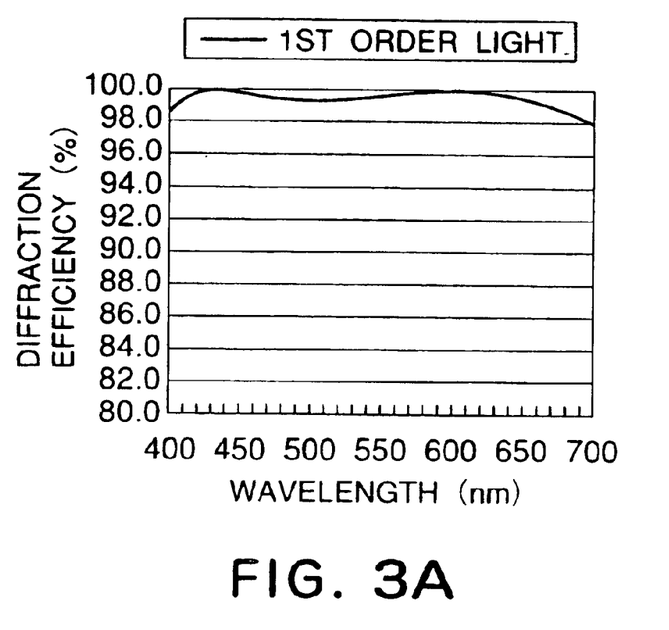
FIGS. 3A and 3B are graphs, respectively, for explaining diffraction efficiencies of the diffractive optical element in the first embodiment of the present invention.
Figure 3B:
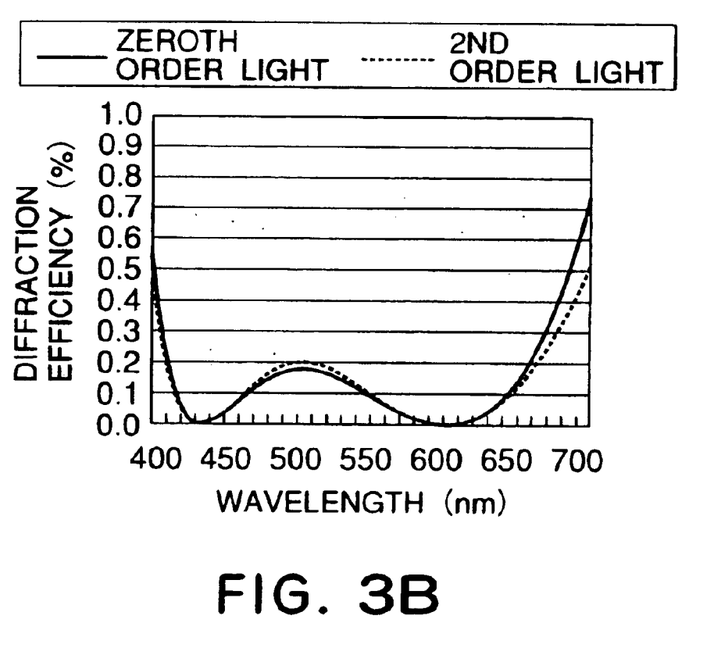

FIGS. 3A and 3B show diffraction efficiencies of first-order diffraction light as well as zeroth-order light and second-order diffraction light, both around the first-order diffraction light, in the structure described above. It is seen from these graphs that the first-order diffraction light maintains a high diffraction efficiency throughout the whole visible wavelength region. Also, it is seen that the zeroth-order light and the second-order diffraction light are reduced as compared with the conventional example shown in FIG. 14.

Figure 4:
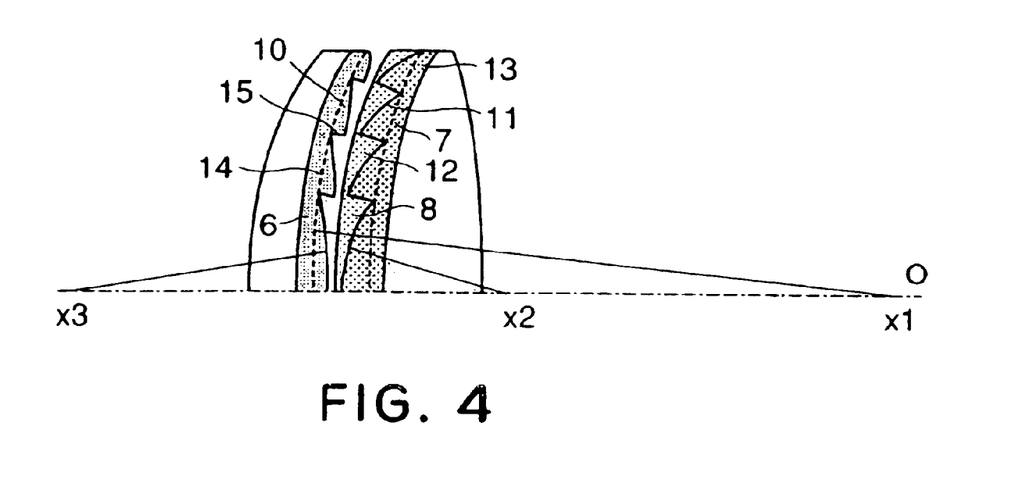
FIG. 4 is a schematic view showing the sectional shape of diffraction gratings in the first embodiment of the present invention.

Referring now to FIGS. 2 and 4, the shape in a case where a diffraction grating is formed on a curved surface in accordance with the present invention, will be explained in detail.

A structure in which a diffractive optical element such as described above is formed on a curved surface (hereinafter, "reference curved surface") having a curvature radius R, is considered. Also, a case where the grating surfaces 10 and 11 face in different directions such as shown in FIG. 2, will be discussed.

In this example, the diffraction gratings are so formed that their grating surfaces face in different directions, such as shown in FIG. 16, by which, as compared with the structure shown in FIG. 17 wherein the grating surfaces face in the same direction, the variation of diffraction efficiency due to a change in incidence angle of incident light can be suppressed.

Further, the diffractive optical element shown in FIG. 2 is so structured that the function of a positive diffractive lens is provided only by potions of three accumulated diffraction gratings, without using the curvature of the base surface on which the diffraction grating is formed. Similarly, the first diffraction grating 6, by itself, provides a function of a positive diffractive lens. The second and third diffraction gratings 7 and 8 provide, by themselves, when combined, a function as a negative diffractive lens. Further, these three diffraction gratings, when disposed juxtaposed or closely contacted, provide a function of a positive diffractive lens, as described hereinbefore. In order that the structure as a whole functions as a single diffractive optical element, a curved plane 14 connecting the grating peaks of the first diffraction grating 6, a curved plane 12 opposite to the grating surface of the third diffraction grating, and a curved plane 13 connecting the grating peaks of the second and third diffraction gratings 7 and 8, all have substantially the same curvature radius. More exactly, these planes have the same curvature center. This means that, where the planes are considered in relation to convexity or concavity, one of the curved planes 13 and 14 is convex and the other is concave. In FIG. 4, the curved plane 13 is convex and the cured plane 14 is concave.

In FIGS. 2 and 4, the first diffraction grating 6 comprises a positive diffractive lens formed on the curved plane 14. Further, the grating edge of the first diffraction grating 6 is defined so as to become perpendicular to the curved plane 14. Similarly, the second diffraction grating 7 comprises a positive diffractive lens formed on the curved plane 13. The third diffraction grating 8 is formed so as to cover in the grating elements of the second diffraction grating 7, such that the second diffractive optical element 2 can provide, only with its grating elements, the function as a negative diffractive lens. Also, the grading edges of the second and third diffraction gratings are made perpendicular to the curved plane 13.

Next, fabrication of a diffractive optical element having a structure according to the present invention will be explained.

From the standpoint of mass-production, it would be preferable to prepare a mold having a grating shape and, by using it, to reproduce a diffractive optical element on the basis of the molding. Where a molding process is used, it is necessary to separate a molded piece from the mold.

Figure 5:
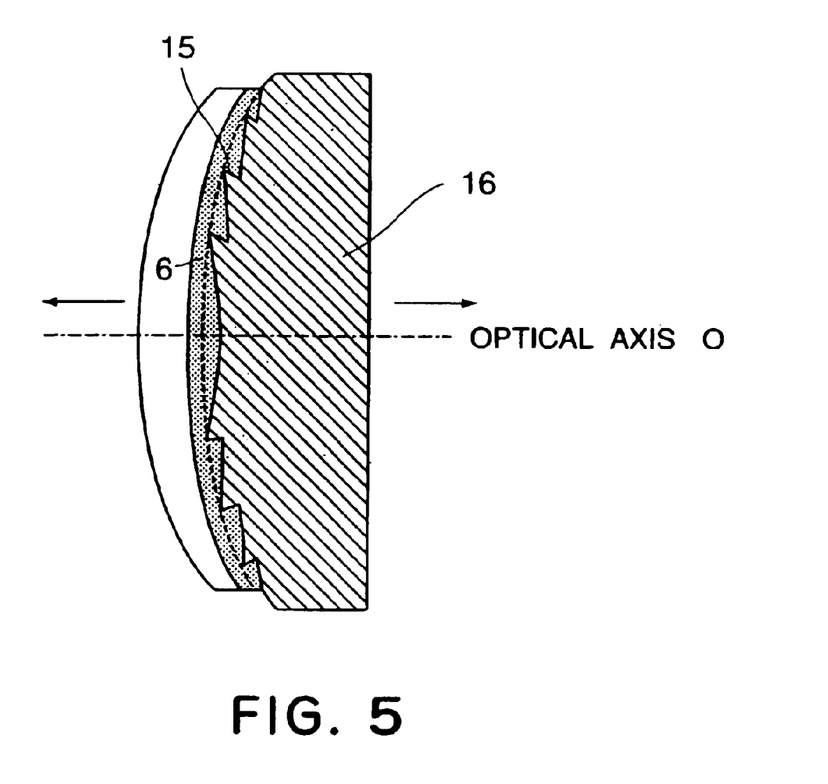
FIG. 5 is a schematic view for explaining reproduction of a first diffractive optical element, in accordance with the first embodiment of the present invention.

FIG. 5 illustrates mold release, releasing a first diffraction grating 6 (FIG. 4) from a mold 16. For release from the mold 16, the piece should be shifted in the direction of an optical axis O in the drawing. However, because the grating edge portion 15 is formed perpendicularly to the base curved surface, the motion is blocked. Thus, with this shape, the mold release in the optical axis direction is unattainable.

Figure 6:
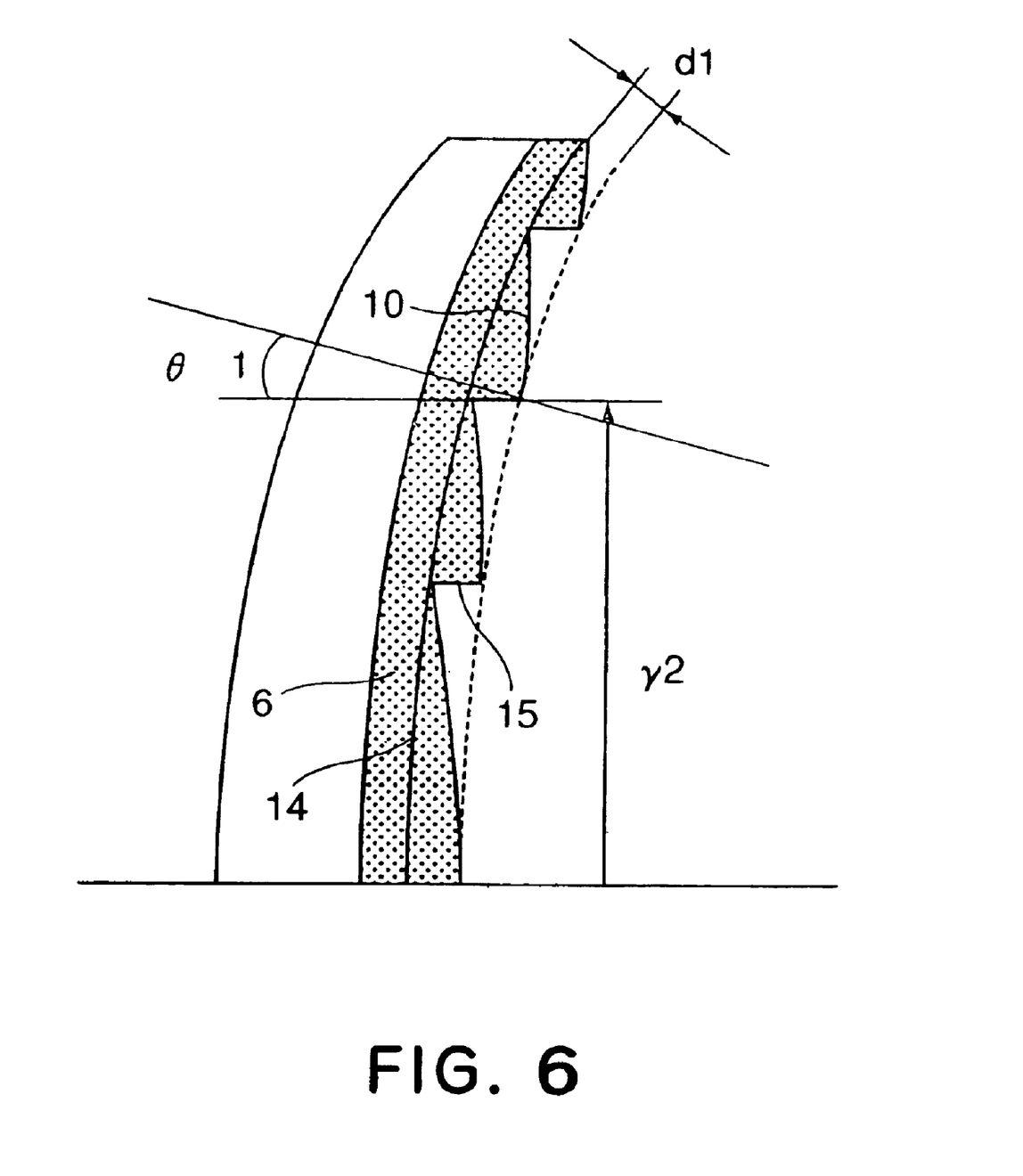
FIG. 6 is a schematic view of the first diffractive optical element in the first embodiment of the present invention.

In consideration of this, as shown in FIG. 6, the edge portion 15 of the diffraction grating is formed so as to become parallel to the optical axis. With such grating shape, mold release along the optical axis direction is enabled. In this case, an angle $\theta 1$ is defined between the grating edge and a normal from the grating peak toward the curved plane 14. The angle $\theta 1$ gradually increases as the grating rings are more remote from the optical axis.

Next, the influence of the grating shape such as shown in FIG. 6 on the diffraction efficiency will be explained. Where the second diffractive optical element has a structure such as shown in FIG. 2, if reproduction based on molding is considered, the shape is such that there is no inconvenience in the mold release even though the grating edge is perpendicular to the curved plane 13.

Actually, it is desirable to explain the diffraction efficiency as a diffractive optical element having combined first and second diffractive optical elements shown in FIG. 6. Since however the second diffractive optical element does not involve any shape change from the standpoint of fabrication, a qualitative explanation will be made on how the characteristic changes when the first diffractive optical element solely changes from the FIG. 2 shape to the FIG. 6 shape.

Figure 7:
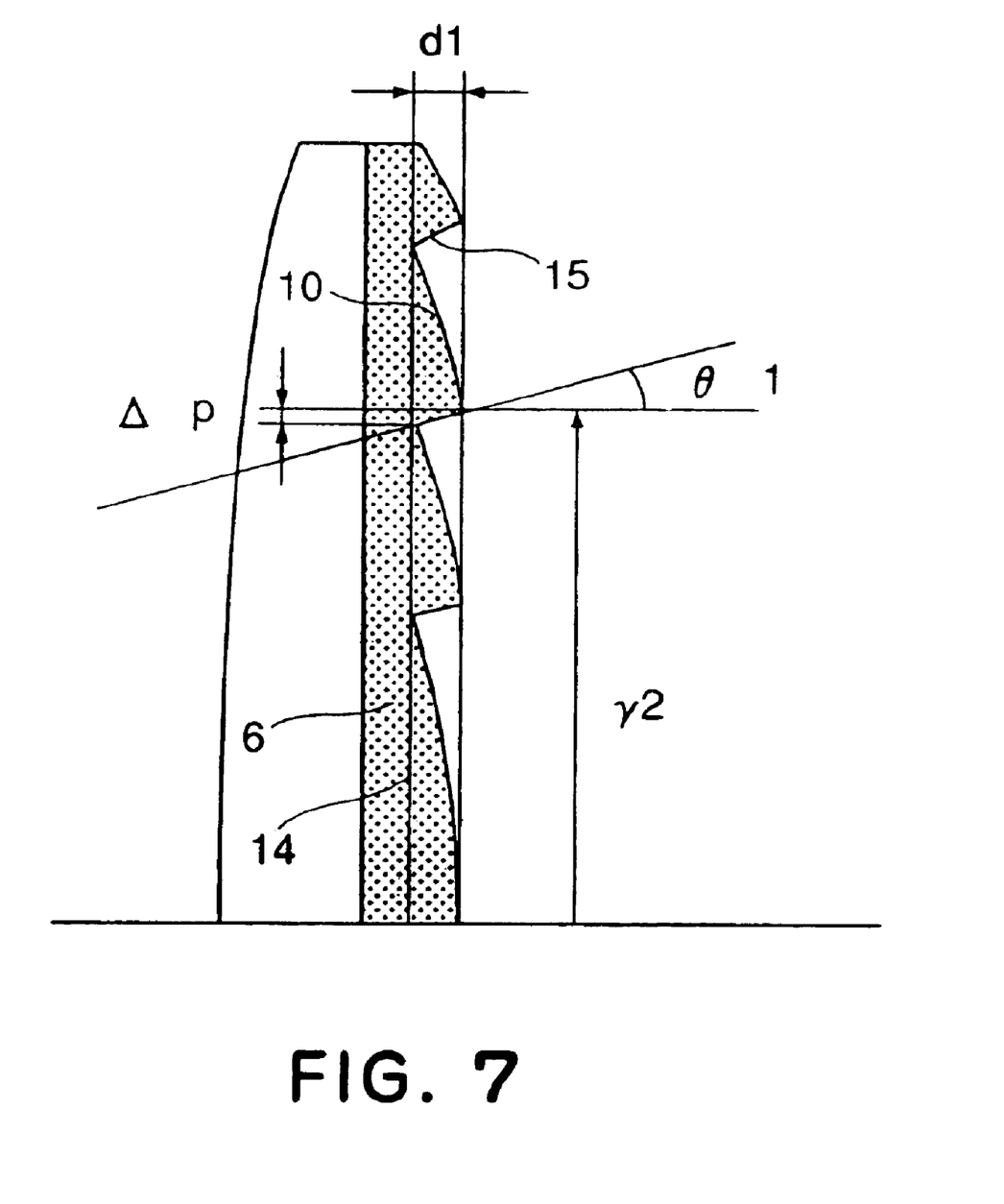
FIG. 7 is a schematic view of a modified example of the first diffractive optical element according to the first embodiment of the present invention.
Figure 8:
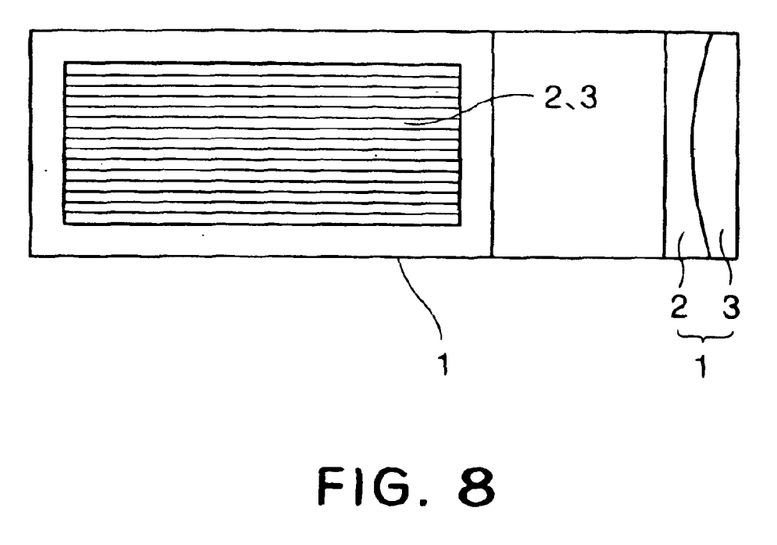
FIG. 8 is a schematic view of a one-dimensional diffractive optical element according to the first embodiment of the present invention.

The performance of a grating can be described in terms of the vector in the periodic direction of the grating and the component perpendicular to it. Thus, for simplification of explanation, a shape in which the grating period vector is always placed in a certain direction will be considered here. The state that the grating period vector is always placed in a certain direction means that the grating is formed on a flat plane. So, FIG. 7 illustrates the shape in which the base curved plane 14 of the diffractive optical element of FIG. 6 is bent into a flat plane. Forming the grating edge in parallel to the optical axis as shown in FIG. 6 is equivalent, in the case of FIG. 7, to that the edge face of each grating tilts by $\theta 1$. If this tilt is projected to the grating period direction, the component $\Delta p$ thereof is expressed by:

$$\Delta p = d1 * \tan \theta 1.$$

wherein d1 is the grating thickness of the first diffractive optical element. Therefore, as the grating thickness is larger and the edge tilt angle is larger, $\Delta p$ becomes larger. Also, it is known that, generally, as the proportion of $\Delta p$ to the grating pitch becomes larger, deterioration in performance of a diffractive optical element having an idealistic shape (the edge is perpendicular to the grating period pitch) becomes significant. Basically, this applies to the accumulative type diffractive optical element of this embodiment. Even when combined with the second diffractive optical element, if the performance of the first diffractive optical element singly is deteriorated, there occurs a corresponding decrease of the performance. In order to suppress $\Delta p$, it is necessary to keep the tilt angle $\theta 1$ small, to make the grating thickness d1 small, or to make the grating pitch large.

Among theses options, making the grating pitch large is equivalent to making the power of the diffractive lens small. This leads to that, when the diffractive optical element of this embodiment is incorporated into an optical system, the effect of the diffractive lens is undesirably restricted. Similarly, making the tilt angle $\theta 1$ small is equivalent to slowing the base curvature radius. This is not desirable since it results in restriction to the performance as an optical element. Thus, as regards the grating structure, a structure in which the grating thickness d1 is kept small is desirable.

As described above, where the substrate on which a diffractive optical element is to be formed has a curved surface, the order of gratings which constitute the accumulative diffractive optical element may be appropriately set when a diffraction grating having a positive power is formed on a concave surface while a diffraction grating having a negative power is formed on a convex surface. More specifically, the grating thicknesses and signs (convex or concave) of diffractive optical elements constituting the accumulative diffractive optical element, as well as the sign of the substrate curved surface, are compared with each other. If there is a difference in sign as described hereinbefore (for example, a convex diffraction grating is formed upon a concave surface), a smallest grating thickness may be chosen for that surface.

This corresponds to making the structure so that, in FIG. 4, among curvature radii (x2 and x3 in FIG. 4) of grating surface (first ring in the FIG. 4 example) where the grating pitch of the diffraction grating becomes largest, the curvature radius (x3 in FIG. 4) of the grating surface corresponding to the diffraction grating having a smallest grating thickness has a different sign as compared with that of the curvature radius (x1 in FIG. 4) of the substrate.

The foregoing description has been made with reference to a diffractive optical element in which the diffraction grating has a reference curved surface of a spherical surface shape. However, the present invention is applicable also to a diffractive optical element in which the diffraction grating has a reference curved surface of an aspherical surface shape, a cylindrical surface shape, a toric surface shape or any other surface shape.

[Embodiment 2]

Figure 9:
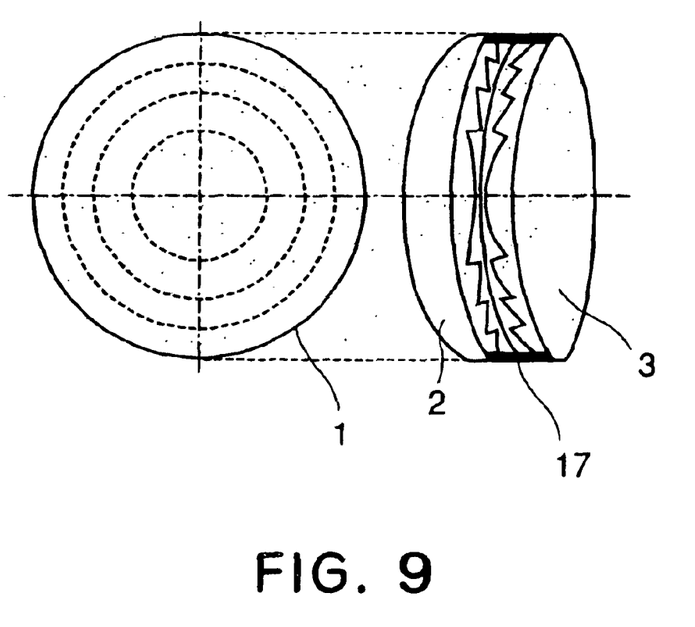
FIG. 9 is a schematic view of a diffractive optical element according to a second embodiment of the present invention4.

In the first embodiment, the first and second diffractive optical elements 2 and 3 are disposed in close juxtaposition with each other. In this case, the relative position of the two diffractive optical elements 2 and 3 must be adjusted very precisely. In consideration of this, in a second embodiment of the present invention, as shown in FIG. 9, two diffractive optical elements are bonded to each other at a non-grating region where no grating of the diffractive optical element is present. With this arrangement, if the assembling process up to the bonding is carried out in a clean environment such as a clean room, for example, adhesion of dust particles to the grating surface can be reduced significantly. Further, since there is no possibility of contact to the grating surface after the bonding, the assembling operation for incorporating the diffractive optical element into another optical system become much easier.

[Embodiment 3]

Figure 10:
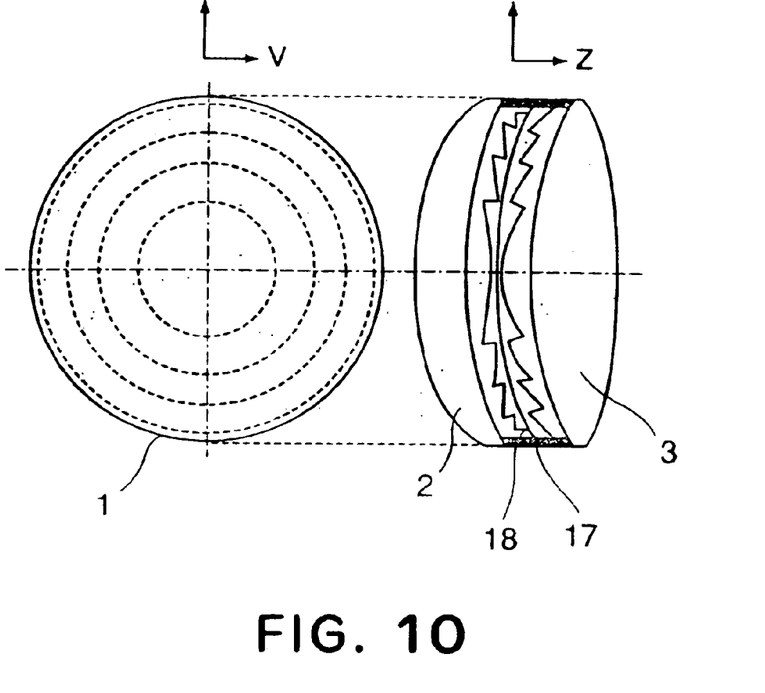
FIG. 10 is a schematic view of a diffractive optical element according to a third embodiment of the present invention.

In the first and second embodiments described above, the diffractive optical element comprises first and second diffractive optical elements 2 and 3 disposed close to each other. In the second embodiment, a three-dimensional error may be produced in respect to the relative position of the two diffractive optical elements. This needs a long time to accomplish relative alignment before the bonding. In the third embodiment, in consideration of it, as shown in FIG. 10, there is a zone or location 18 defined in the non-grating region of the optical element 2, for example, which zone is effective to regulate the spacing in respect to the grating height direction. With this structure, the relative spacing in the grating height direction can be determined very precisely. Consequently, the alignment process is required only with respect to two-dimensional direction along the curved surface, and the therefore the operation becomes much easier.

Further, there is no possibility of mutual contact between the diffraction gratings during the alignment operation, which otherwise might cause deformation of grating free ends. The grating height regulating zone 18 of this embodiment may preferably be made as a unit with the grating, by using the same material as the grating, simultaneously when the diffraction grating is produced. This is desirable in respect to the precision and the cost. Furthermore, where the substrate has a lens shape such as shown in FIG. 1, adjustment may be done during the alignment adjustment operation so that any relative eccentricity between the two lenses is cancelled. This enables a good-performance diffractive optical element having a reduced eccentricity.

[Embodiment 4]

In the diffractive optical elements according to the first to third embodiments, the substrate and the diffraction grating are made of different materials. However, the present invention is not limited to this. The diffraction grating and the substrate are made of the same material, and they may be formed integrally. In the fourth embodiment, the grating is made of the same material as of the substrate. By this, the positional precision in relation to the substrate outside diameter and to the grating center is improved significantly. Alternatively, if the substrate is formed with a lens shape, the lens core of the substrate and the grating center can be aligned with each other very accurately. Therefore, in accordance with this embodiment, the optical-axis alignment precision for incorporating a diffractive optical element into another lens is improved significantly. Thus, any degradation of aberration such as a decrease of imaging performance due to a caused eccentricity of the element, can be reduced remarkably.

[Embodiment 5]

Figure 11:
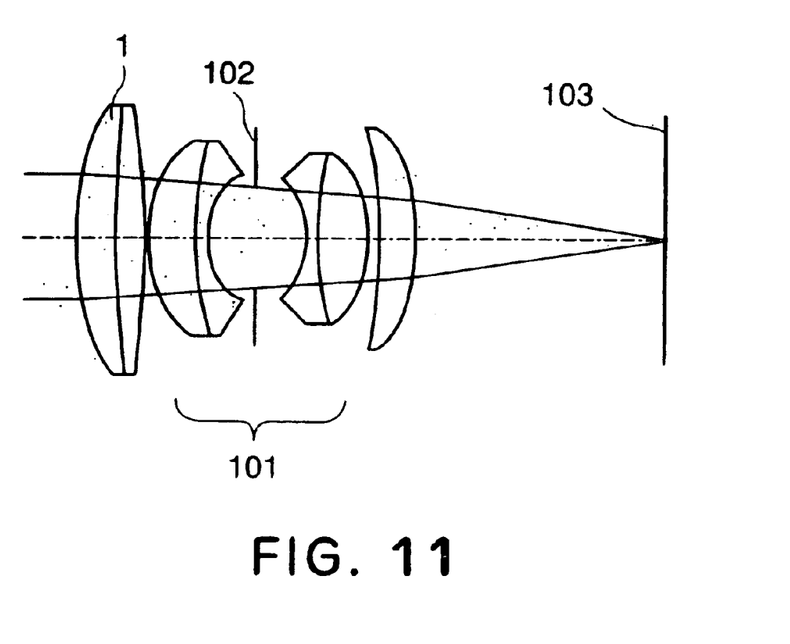
FIG. 11 is a schematic view showing a photo-taking optical system according to a fifth embodiment of the present invention.

FIG. 11 shows the structure according to a fifth embodiment of the present invention.

Specifically, FIG. 11 shows a section of a photo-taking optical system such as a camera, for example. In the drawing, denoted at 101 is a photo-taking lens which includes a stop 102 and a diffractive optical element 1 of the present invention, disposed inside. Denoted at 103 is a film or a CCD, at an imaging plane.

With the diffractive optical element structure such as described, the wavelength dependency of the diffraction efficiency is improved significantly. As a result, a high-performance photo-taking lens having small flare but having a high resolving power is provided. Also, since the diffractive optical element can be produced easily, an inexpensive optical system suitable for mass-production of photo-taking lenses is accomplished.

In FIG. 11, a diffractive optical element having a structure according to the present invention is provided at the bonding face of a front cemented lens. However, the present invention is not limited to this. The diffractive optical element may be provided at any other lens surface. Further, plural diffractive optical elements may be provided inside a photo-taking lens.

Although this embodiment concerns a photo-taking lens of a camera, the invention is not limited to this. Substantially the same advantageous effects are attainable when the diffractive optical element is applied to an imaging optical system to be used in a wide wavelength region, such as a photo-taking lens of a vireo camera, an image scanner, or a reader lens of a digital copying machine, for example.

[Embodiment 6]

Figure 12:
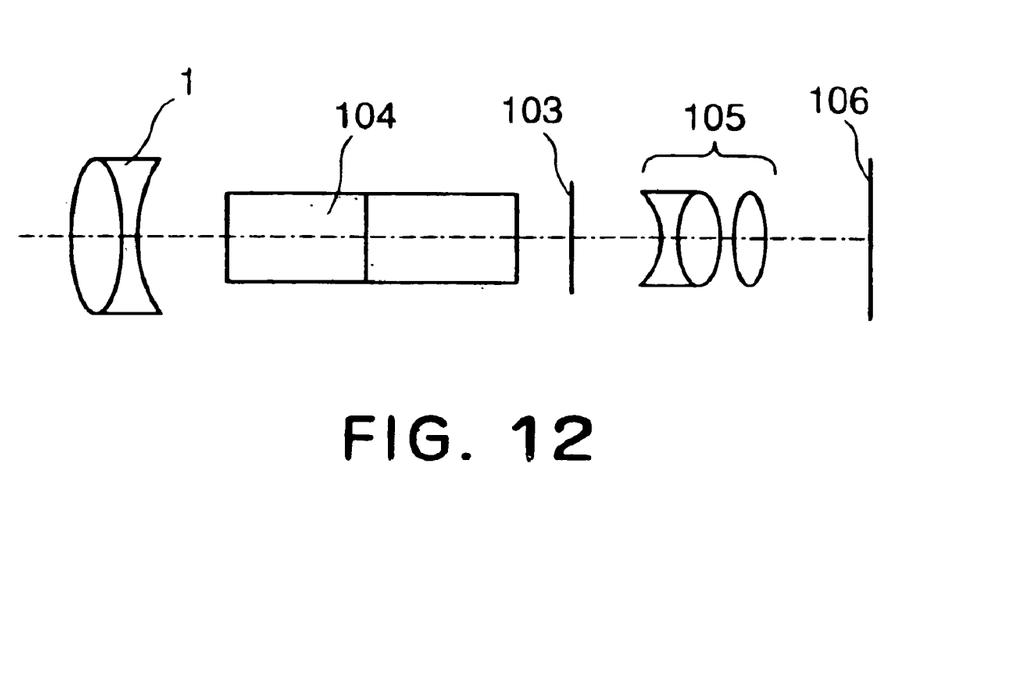
FIG. 12 is a schematic view showing an observation optical system according to a sixth embodiment of the present invention.

FIG. 12 shows the structure according to a sixth embodiment of the present invention.

Specifically, FIG. 12 shows a section of an observation optical system such as a binocular, for example. Denoted in the drawing at 1 is an objective lens which comprises a diffractive optical element. Denoted at 104 is a prism for accomplishing an image. Denoted at 105 is an eyepiece lens, and denoted at 106 is an evaluation plane (pupil plane). Denoted at 1 in the drawing is the diffractive optical element according to the present invention, and this is provided in order to correct chromatic aberration, for example, on the imaging plane of the objective lens.

With the structure of the diffractive optical element as described above, the wavelength dependency of the diffraction efficiency is improved significantly. As a result, a high-performance objective lens having small flare but having a high resolving power at a low frequency is provided. Also, since the diffractive optical element can be produced easily, an inexpensive optical system suitable for mass-production of observation optical systems is accomplished.

Although this embodiment concerns a diffractive optical element which is provided in a portion of an objective lens, the present invention is not limited to this. Substantially the same advantageous effects are obtainable even when the diffractive optical element is provided at the surface of a prism or inside an eyepiece lens. However, if it is provided at a side of the imaging plane 103, facing the object side, an effect of reducing chromatic aberration only in the objective lens is assured. Therefore, in the case of a naked-eye observation system, it is desirable to place a diffractive optical element at a side of the imaging plane 103, facing the objective lens.

Further, while this embodiment relates to a binocular, the invention is not limited to this. It can be applied to a telescope or an astronomical telescope, for example. Moreover, similar effects are obtainable with an optical type finder for a lens shutter camera or a video camera, for example.

In accordance with the embodiments of the present invention as described hereinbefore and with the structure described above, even in a case where a diffractive optical element is provided on a curved surface, unwanted decrease of the diffraction efficiency can be reduced. Thus, a grating shape best suited to provision, on a curved surface, of a diffractive optical element having a high diffraction efficiency throughout a wide wavelength region. Particularly, a grating shape best suited to a case where plural gratings facing in different directions are to be formed on a curved surface, is accomplished. As a result of this, a high diffraction efficiency of the same level as a diffractive optical element formed on a flat surface, can be maintained. Further, in respect to fabrication, a molding process using a mold, which is good for mass-production, can be used.

A structure in which two diffractive optical elements are bonded with each other at a non-grating region, may be used. This makes it very easy to handle the diffractive optical element. Further, it enables to provide a diffractive optical element with small adhesion of dust particles to the grating elements.

A structure in which a grating height regulating section, may be provided for the non-grating region. With this structure, alignment of two gratings is required only in respect to the grating ring direction. Therefore, the assembling becomes much easier. Further, the possibility of interference of gratings during the alignment operation or the possibility of deformation of the grating free ends is much reduced.

The substrate and the grating element of the diffractive optical element may be made of the same material, and the substrate and the diffractive optical element may be made integral. In that occasion, the positional precision of the substrate outside diameter and the grating center and, if the substrate is a lens, the precision of the substrate lens core and the grating center, can be improved significantly. Thus, deterioration of the imaging performance due to eccentricity is reduced considerably, and a lens system of good performance is provided.

The diffractive optical element of the structure described above can be applied to a photo-taking lens and, in that occasion, an inexpensive and high precision photo-taking lens is provided.

The diffractive optical element of the structure described above can be applied to an observation optical system and, in that occasion, an inexpensive and high performance observation optical system is provided.

While the invention has been described with reference to the structures disclosed herein, it is not confined to the details set forth and this application is intended to cover such modifications or changes as may come within the purposes of the improvements or the scope of the following claims.

What is claimed is:

1. A diffractive optical element made of at least two materials of different dispersions, and including at least two diffraction gratings accumulated one upon another, wherein:
    each diffraction grating is formed on a curved surface of a substrate; and
    a diffraction grating, from among said at least two diffraction gratings, in which a curvature radius of the curved surface and a curvature radius of a grating surface in a portion where a grating pitch is largest, have different signs, is one of said at least two diffraction gratings which has a smallest grating thickness.

2. A diffractive optical element according to claim 1, wherein said diffraction grating having a smallest grating thickness is structured so that an angle which is defined between the grating surface and a grating edge of that diffraction grating is obtuse and is greater than an angle which is defined between the grating surface and a normal to the surface at a position where a plane connecting grating free ends of the smallest-thickness diffraction grating and the grating surface intersect with each other.

3. A diffractive optical element according to claim 1 or 2, wherein the grating edge of the diffraction grating is made parallel to an optical axis.

4. A diffractive optical element according to claim 1 or 2, wherein the curvature of the plane connecting the grating free ends is approximately even, in each diffraction grating of said at least two accumulated diffraction gratings.

5. A diffractive optical element acceding to claim 1 or 2, wherein at least one of said at least two diffraction gratings is formed at an interface of two different materials having different dispersions.

6. A diffractive optical element according to claim 1 or 2, wherein said at least two accumulated diffraction gratings are bonded with each other in a non-grating region.

7. A diffractive optical element according to claim 1 or 2, wherein said at least two diffraction gratings include at least one grating of a shape in which a direction of the grating thickness is different.

8. A diffractive optical element according to claim 1 or 2, wherein said diffractive optical element is effective to improve a diffraction efficiency of a predetermined order, over a whole visible light region of a used wavelength.

9. A diffractive optical element according to claim 1 or 2, wherein there is a wavelength included in the used wavelength range which wavelength satisfies the following relation:

$$\pm(n01-1)d1\pm(n03-1)d2\pm(n02-1)d2=m\lambda 0$$

where n01 is a refractive index of the material of a first diffraction grating with respect to a wavelength λ0, n02 is a refractive index of the material of a second diffraction grating with respect to the wavelength λ0, n03 is a refractive index of the material of a third diffraction grating with respect to the wavelength λ0, d1 and d2 are thicknesses of the first and second diffraction gratings, and m is a diffraction order.

10. A diffractive optical element according to claim 1 or 2, wherein the substrate has a lens function.

11. A diffraction optical system including a diffractive optical element as recited in claim 1 or 2.

12. A diffraction optical system according to claim 11, wherein said optical system is an imaging optical system.

13. A diffraction optical system according to claim 12, wherein said diffractive optical element is provided at one of a lens cemented surface and a lens surface, or inside a lens.

14. A diffraction optical system according to claim 11, wherein said optical system is an observation optical system.

15. A diffraction optical system according to claim 14, wherein said diffractive optical element is provided at a side of a lens, constituting the observation optical system, which faces an objective lens side thereof.

16. A diffractive optical element having a plurality of laminated diffraction gratings made of at least two materials having different dispersions, said element comprising:
    two diffraction gratings provided on two curved surfaces,
        wherein, in one of the two diffraction gratings, an optical power attributable to diffraction and an optical power attributable to refraction of that curved surface having the one diffraction grating formed thereon have mutually different signs,
    wherein, in the other diffraction grating, an optical power attributable to diffraction and an optical power attributable to refraction of that curved surface having the other diffraction grating formed thereon have the same sign, and wherein the one diffraction grating has a grating thickness smaller than the other diffraction grating.

17. The diffractive optical element to claim 16, wherein optical powers of the two curved surfaces attributable to refraction have mutually different signs.

18. The diffractive optical element according to claim 16, wherein the one diffraction grating is a diffraction grating formed on a concave surface and has a positive optical power, and wherein the other diffraction grating is a diffracting grating formed on a convex surface and has a positive optical power.

19. The diffractive optical element according to claim 16, further comprising another diffraction grating in close contact with the other diffraction grating and being made of a material different in dispersion from the other diffraction grating.

20. A diffractive optical element having a plurality of laminated diffraction gratings, and including at least two materials having different dispersions, said element comprising:

a first diffraction grating provided on a first curved surface, wherein an optical power of said first diffraction grating has a sign different from that of an optical power due to refraction of the first curved surface; and a second diffraction grating provided on a second curved surface, wherein an optical power of the second diffraction grating has the same sign as that of an optical power due to refraction of the second curved surface, wherein said first diffraction grating has a grating thickness smaller than the second diffraction grating.

21. The diffractive optical element according to claim 20, wherein the optical powers of the first and second curved surfaces attributable to refraction have mutually different signs.

22. The diffractive optical element according to claim 20, further comprising a third diffraction grating in close contact with said second diffraction grating and being made of a material different in dispersion from said second diffraction grating.

23. A diffractive optical element having a plurality of laminated diffraction gratings laminated, and including at least two materials having different dispersions, said element comprising:

a first diffraction grating provided on a curved surface having a concave shape and a positive optical power; and a second diffraction grating provided on a curved surface having a convex shape and a positive optical power, wherein said first diffraction grating has a grating thickness smaller than said second diffraction grating.

24. The diffraction optical element according to claim 23, further comprising a third diffraction grating in close contact with said second diffraction grating and having a negative optical power, said third diffraction grating being made of a material different in dispersion from said second diffraction grating.

25. A diffractive optical element having a plurality of diffraction gratings laminated and including at least two materials having different dispersions, said element comprising:

a diffraction grating provided on a curved surface, wherein, in said diffraction grating, an optical power attributable to diffraction has a sign different from that of an optical power attributable to refraction at that curved surface having said diffraction grating formed thereon, and wherein said diffraction grating formed on said curved surface has a smallest grating thickness among said plurality of diffraction gratings.

* * * * *